(12) United States Patent
Sedaghat et al.

(10) Patent No.: US 11,648,955 B2
(45) Date of Patent: May 16, 2023

(54) VOICE ASSISTANT SYSTEM

(71) Applicant: Volvo Car Corporation, Gothenburg (SE)

(72) Inventors: Alborz Sedaghat, Gothenburg (SE); Mikael Gordh, Ytterby (SE)

(73) Assignee: Volvo Car Corporation, Gothenburg (SE)

( * ) Notice: Subject to any disclaimer, the term of this patent is extended or adjusted under 35 U.S.C. 154(b) by 136 days.

(21) Appl. No.: 16/840,524

(22) Filed: Apr. 6, 2020

(65) Prior Publication Data
US 2020/0324785 A1 Oct. 15, 2020

(30) Foreign Application Priority Data
Apr. 10, 2019 (EP) .................................. 19168432

(51) Int. Cl.
*B60W 50/10* (2012.01)
*G06F 3/16* (2006.01)
*G10L 15/26* (2006.01)

(52) U.S. Cl.
CPC ............ *B60W 50/10* (2013.01); *G06F 3/167* (2013.01); *G10L 15/26* (2013.01)

(58) Field of Classification Search
None
See application file for complete search history.

(56) References Cited

U.S. PATENT DOCUMENTS

| 6,927,694 B1 | 8/2005 | Smith et al. |
| 9,916,503 B2 | 3/2018 | Cho |
| 10,121,084 B2 | 11/2018 | Yadhunandan et al. |
| 2006/0262935 A1* | 11/2006 | Goose .................. H04S 3/002 381/17 |
| 2009/0055180 A1* | 2/2009 | Coon ................. B60R 16/0373 704/251 |
| 2012/0295708 A1* | 11/2012 | Hernandez-Abrego ................ A63F 13/213 463/36 |

(Continued)

FOREIGN PATENT DOCUMENTS

| DE | 102016214047 A1 | 2/2018 |
| DE | 102017205135 A | 9/2018 |

(Continued)

OTHER PUBLICATIONS

Sep. 5, 2019 European Search Report issued on International Application No. 19168432.

*Primary Examiner* — Nafiz E Hoque
(74) *Attorney, Agent, or Firm* — Clements Bernard Walker; Christopher L. Bernard (57) ABSTRACT

The disclosed subject matter generally relates to a voice assistant system for a vehicle which can distinguish who is issuing voice commands, and thereby also which sub-system in the vehicle to control according to the voice command. This is obtained by allowing the voice assistant system to receive input signals from an image capturing system configured to detect the user issuing the voice command. The vehicle compartment may be divided into several zones each associated with at least one sub-system, and the input signals from the image capturing system provide information to the control unit of the voice assistant system regarding the present zone of the user issuing the voice commands.

12 Claims, 5 Drawing Sheets

(56) References Cited

U.S. PATENT DOCUMENTS

| | | | |
|---|---|---|---|
| 2012/0300061 A1* | 11/2012 | Osman | G06F 3/013 |
| | | | 348/135 |
| 2013/0255909 A1 | 10/2013 | Matsumoto | |
| 2014/0067201 A1* | 3/2014 | Visintainer | B60R 16/0373 |
| | | | 701/36 |
| 2014/0214424 A1* | 7/2014 | Wang | G06V 40/20 |
| | | | 704/246 |
| 2015/0084764 A1 | 3/2015 | Wunsche | |
| 2016/0167661 A1 | 6/2016 | Kuehne et al. | |
| 2016/0196098 A1 | 7/2016 | Roth et al. | |
| 2016/0368422 A1 | 12/2016 | Uppal | |
| 2017/0068093 A1 | 3/2017 | Bouaziz | |
| 2017/0160908 A1 | 6/2017 | Feit et al. | |
| 2017/0185146 A1 | 6/2017 | Groh et al. | |
| 2017/0247031 A1 | 8/2017 | Feit et al. | |
| 2018/0157332 A1 | 6/2018 | Nie | |
| 2018/0247037 A1 | 8/2018 | Weller et al. | |
| 2020/0105256 A1* | 4/2020 | Fainberg | G10L 15/16 |
| 2020/0135190 A1* | 4/2020 | Kaja | G06V 40/172 |

FOREIGN PATENT DOCUMENTS

| | | |
|---|---|---|
| EP | 20280161 A2 | 2/2009 |
| EP | 20280162 A2 | 2/2009 |
| WO | 2018006019 A1 | 1/2018 |
| WO | 2018083214 A1 | 5/2018 |

\* cited by examiner

VOICE ASSISTANT SYSTEM

CROSS-REFERENCE TO RELATED APPLICATION

The present disclosure claims the benefit of priority of co-pending European Patent Application No. 19168432.3, filed on Apr. 10, 2019, and entitled "A VOICE ASSISTANT SYSTEM," the contents of which are incorporated in full by reference herein.

TECHNICAL FIELD

The present disclosure generally relates to a voice assistant system configured to receive voice commands and provide instructions to vehicle sub-systems.

BACKGROUND

Recently, more mature voice recognition assistants have reached the smart speaker market and smart phone market. This development, lead by advances in artificial intelligence powered technology, also made its way into the automotive industry. More specifically it is becoming more common that modern vehicles are equipped with voice recognition assistant systems which allow a user to control various electronic systems of the vehicle via orally issued audio commands.

A voice recognition assistant system has a microphone for capturing the audio input and a processor for processing the audio input. The processor utilizes a voice recognition algorithm, often including machine learning techniques, for decoding the audio input to a control command for controlling an electric system, such as an entertainment system of the vehicle.

With the recent advances in voice recognition, current systems are reasonably accurate in decoding audio commands. For example, a user of the vehicle may, by speaking to the voice recognition assistant system, control the entertainment system in the vehicle to increase the volume or change the music track. This audio command will thus change the overall setting for the entire vehicle.

However, there may be situations where a single occupant of the vehicle desires a more local setting, for example to increase or decrease the volume in the speaker closest to the occupant. This may be solved in various ways, but present voice recognition assistant systems are relatively unfit to in a user-friendly manner accommodate such individual requests.

Accordingly, there is a desire to further improve the user friendliness of voice recognition assistant system to more accurately respond to individual requests from occupants of the vehicle.

SUMMARY

The disclosed subject matter generally relates to a voice assistant system for a vehicle which can distinguish who is issuing voice commands, and thereby also which sub-system in the vehicle to control according to the voice command.

With the proposed voice assistant system, the issue of relying on voice recognition itself to conclude from who or where the voice command originates is at least alleviated or even eliminated. Further, with the proposed voice assistant system a user in the vehicle may be able to control a respective sub-system associated with the location of the user with less complicated voice commands.

The above advantages are obtained by allowing the voice assistant system to receive input signals from an image capturing system configured to detect the user issuing the voice command. The vehicle compartment may be divided into several zones each associated with at least one sub-system. The input signals from the image capturing system provide information to the control unit of the voice assistant system regarding the present zone of the user issuing the voice commands.

Accordingly, the voice assistant system which comprises at least one audio capturing device for capturing voice commands from a user, is also configured to receive image data, or generally an input signal, indicating the present zone of the vehicle compartment from which the voice command was issued. The control unit of the voice assistant system is configured to provide a control signal to the sub-system associated with the present zone to thereby control the sub-system according to the voice command.

Accordingly, the proposed voice assistant system may more accurately determine which subsystem is desirable to control by the user issuing the voice command. Furthermore, the complexity of the voice command itself may be reduce since the user no longer has to say, in the voice command, in which zone he/she is present, or in which zone a specific sub-system setting is desired. The present zone of the user is automatically detected based on the input signal from the image capturing system.

The inventors further realized that most vehicles today are equipped with a driver monitoring system which can detect motions or even perform face tracking of occupants in the vehicle. The driver monitoring system may thus advantageously provide the voice assistant system with input signals to inform the voice assistant system of who was issuing the voice command. Thus, there is in many vehicles no need for a specific image capturing system for the proposed voice assistant system since there is often already a driver monitoring system installed.

It may also be possible to equip the voice assistant system with dedicated image capturing devices, although the preferred implementation is to utilize already present image capturing system in the vehicle.

Vehicles are often equipped with microphones and driver monitoring systems. The inventors therefore also realized to provide a control unit configured to receive, from an audio capturing device such as a microphone, signals indicative of voice commands issued by a user in a vehicle. The control unit is further configured to receive input signals indicative of from which zone of a plurality of zones of a vehicle compartment that the voice command originated. A mentioned above, the control unit is configured to determine the present zone from which the voice command originates and to control a vehicle sub-system in the present zone according to the voice command.

The inventors also propose a corresponding method and computer program product with the same advantages as the above mentioned.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF DRAWINGS

These and other aspects of the present invention will now be described in more detail, with reference to the appended drawings showing example embodiments of the invention, wherein.

DETAILED DESCRIPTION

In the present detailed description, various embodiments of a voice assistant system according to the present disclosure are described. However, this invention may be embodied in many different forms and should not be construed as limited to the embodiments set forth herein; rather, these embodiments are provided for thoroughness and completeness, and to fully convey the scope of the invention to the skilled person. Like reference characters refer to like elements throughout.

Figure 1:
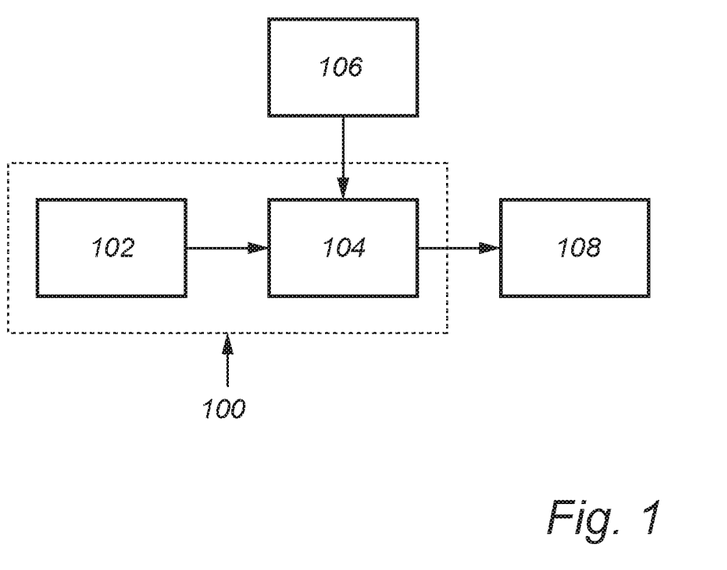
FIG. 1 is a box diagram of a voice assistant system according to embodiments of the present disclosure.

FIG. 1 illustrates a box diagram conceptually representing a voice assistant system 100 according to embodiments of the present disclosure. The voice assistant system 100 is configured to receive voice commands and provide instructions to vehicle sub-systems associated with one of a plurality of zones in a vehicle compartment. The voice assistant system comprises at least one audio capturing device 102 for capturing voice commands from a user. Further, a control unit 104 comprised in the voice assistant system is configured to receive signals indicative of the voice commands from the audio capturing device 102. The control unit 104 is also configured to receive input signals from an image capturing system 106 configured to detect the user issuing the voice commands. The input signals from the image capturing system 106 provide information to the control unit 104 regarding the present zone of the user. The control unit 104 provides a control signal to the sub-system 108 associated with the present zone for controlling the sub-system 108 according to the voice command.

Figure 2:
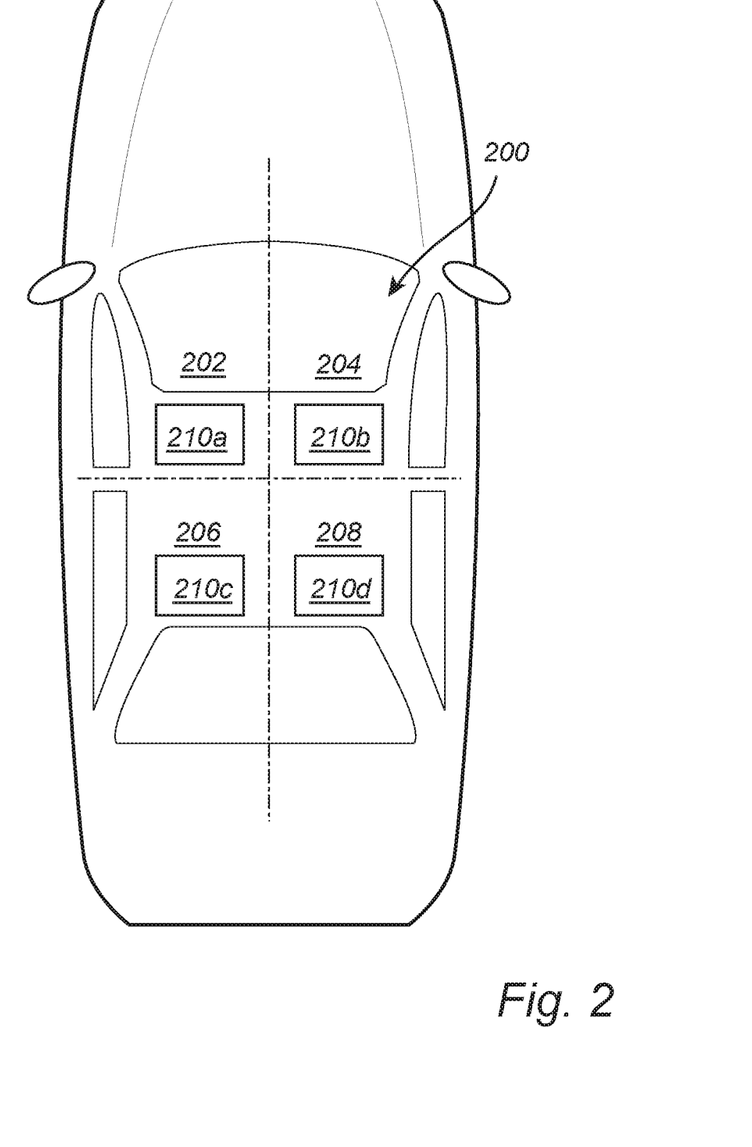
FIG. 2 conceptually illustrates a plurality of zones in a vehicle compartment according to embodiments of the present disclosure.

FIG. 2 conceptually illustrates a vehicle compartment 200 divided into four virtual zones, 202, 204, 206, and 208, where each zone has a respective sub-system 210a-d. A user present in for example zone 202 may issue a voice command, e.g. "increase temperature by 2 degrees". With prior art systems, it is difficult for the voice recognition functionality to determine from which of the zones 202-208 the voice command originated. In other words, such a prior art system would instead increase the temperature in the entire vehicle compartment 200. Alternatively, the user may have to specifically ask the system to "increase temperature by 2 degrees at the driver's location".

The inventors realized that by utilizing an image capturing system, the voice assistant system may receive information of in which of the zones 202-208 the user who issued the voice command is present. The image capturing system may for example include face tracking functionality that allows for detecting which user is speaking. Thus, in the case that the here shown example sub-systems 210a-d are climate control sub-systems, in response to the above voice command "increase temperature by 2 degrees" issued by the driver located in zone 202, a control of climate sub-system 210a would be executed to increase the temperature in zone 202 by 2 degrees.

As a further example, now with the sub-systems 210a-d being part of an entertainment system, a user present in zone 206, i.e. in the left side of the back seat, may issue a voice command "turn off music". An image capturing device included in the image capturing system may be arranged to capture images to perform face tracking of occupants in the back seat, whereby the voice assistant system receives information that the issued command originated from the left side of the back seat, i.e. the user is present in zone 206. The control unit 104 of the voice assistant system may then control the sub-system, i.e. speaker sub-system 210c in the zone 206 to turn off the music in that zone 206.

Accordingly, the proposed voice assistant system can more accurately determine which sub-system to control in response to a received voice command. The voice assistant system also allows for the user to issue voice commands with fewer input words for controlling a respective sub-system since there is no need for the user to specify in which zone of the vehicle the desired setting should be pursued.

In some embodiments, the control unit is configured to provide a feedback control signal to an entertainment sub-system, e.g. subsystem 210b, including a speaker in the present zone, e.g. zone 204 to thereby generate an audio feedback to the user in the present zone via the speaker in the present zone confirming reception and/or execution of the voice command. Accordingly, the voice assistant system may advantageously be configured to confirm a new setting for a vehicle sub-system in the present zone, here exemplified by zone 204, by generating the audio feedback to the user via a speaker in the present zone. In this way, the confirmation may not disturb occupants in the other zones of the vehicle in which the setting of the corresponding sub-system was not altered.

A sub-system 210a-b is herein associated with a respective zone of the vehicle compartment. The sub-system 210a-b is independently controllable in each of the zones 202-208. For example, exemplary systems comprising such sub-systems include climate control systems, a seat control system, an audio control system, window lift control systems, door locking systems, etc. FIG. 2 only includes, for clarity in the drawing, one sub-system per zone, but there may of course be more than one sub-system per zone.

A shown in FIG. 2, the number of zones is at least four. However, the number of zones may vary depending on the type of vehicle. It is advantageous if each seating location in the vehicle associated with a controllable vehicle subsystem has an associated zone in the context of the present disclosure. In this way, accurate local control of the subsystems is possible. Furthermore, the number of sub-systems is not necessarily the same for all seating locations or zones in the vehicle. In addition, the type of sub-systems is not necessarily the same for all seating locations or zones in the vehicle.

In some embodiments, a user may provide a user input, e.g. via a control panel or via voice commands, to merge zones. Based on the user input, the control unit may thus be configured to merge two or more zones into one zone. This is advantageous in case there is fewer occupants in the vehicle than seats, and one occupant desires to control a vehicle sub-system in an adjacent empty zone.

The sub-systems may comprise a respective control unit which is configured to receive the control signals from the control unit of the voice assistant system. Thus, the voice assistant system provides a control signal with information of which sub-system to be controlled and in what way the sub-system is to be controlled.

The control unit 106 may be configured to control the subsystem 108 so that only the sub-system 108 in the present zone where the detected user is located is controlled according to the voice command. In other words, and turning to FIG. 2 again, if a voice command was issued by a user in the zone 208, i.e. in the right back seat, the only the sub-system 210*d* may be controlled according to the issued voice command.

Figure 3:
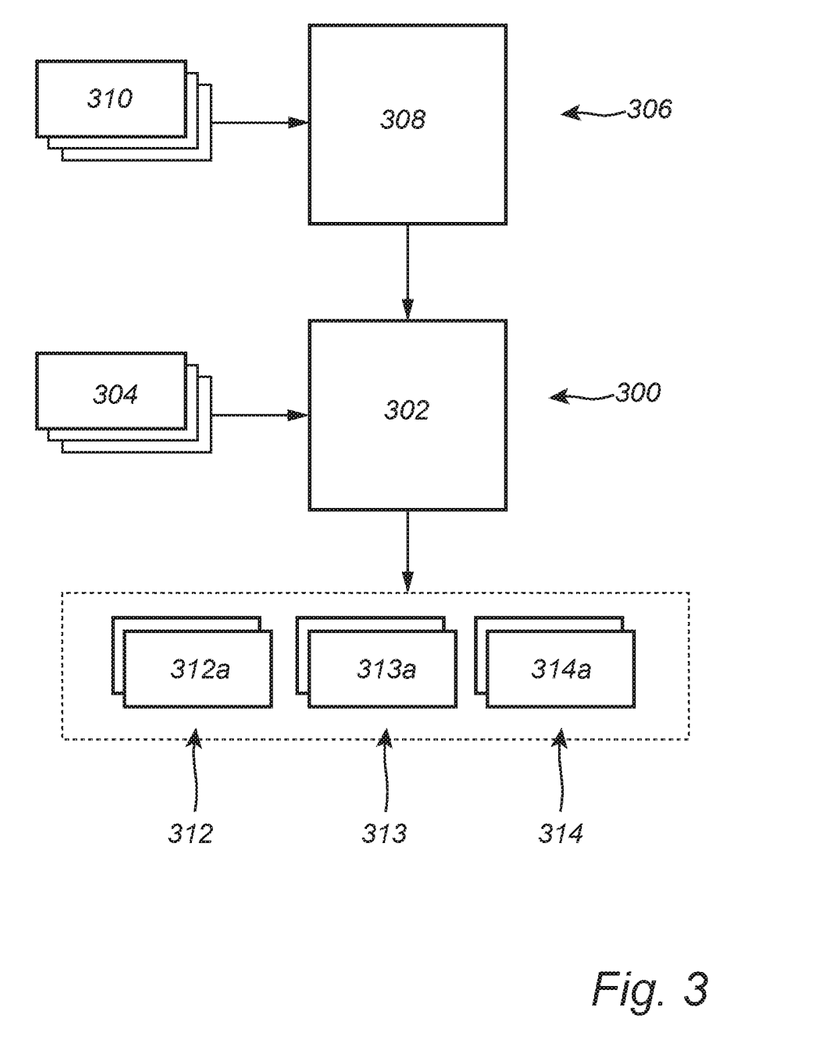
FIG. 3 is a box diagram of a voice assistant system according to embodiments of the present disclosure.

FIG. 3 illustrates one possible voice assistant system 300 according to embodiments of the present disclosure. The voice assistant system 300 comprises at least one audio capturing device in the form of at least one microphone 304. The control unit 302 is configured to receive signals from the microphones 304 indicative of voice commands captured by the microphones 304.

The control unit 302 is further configured to receive input signals from an image capturing system 306 which includes a control unit 308 and at least one image capturing device in the form of at least one camera 310. The camera produces images which are analysed by the control unit 308 to determine the present zone from which a user was issuing voice commands. The image capturing system 306 may include a so-called driver monitoring system which is configured to track facial movements of a user.

The control unit 308 of the image capturing system 306 is thus configured to perform the recognition of in which zone the user issuing a voice command is present. This information is transmitted to the control unit 302 of the voice assistant system 300. In some embodiments the control unit 302 of the voice assistant system 300 performs the recognition for determining the present zone of the user issuing a voice command based on image data received from the cameras 310.

The control unit 302 is connected to the audio capturing device 304 adapted to capture voice commands from the user. The control unit 302 is further connected to the image capturing system 306 adapted to capture image data of vehicle occupants. The control unit 302 is in this way configured to receive the voice command signals from the audio capturing device and the input signals from the image capturing system. Here the control unit 320 of the voice assistant system 300 is connected to the control unit 308 of the image capturing system 306.

The control unit 302 analyses the signals received from the microphones 304 to decode the voice command for understanding the instruction given by the user. Such decoding is per se known to the skilled person and often operates via e.g. pattern recognition algorithms and will not be discussed in further detail herein.

Based on the analysis of the voice command and the input signal from the image capturing system 308, the control unit 302 transmits a control signals to a respective system 312, 313, 314 for controlling the sub-system associated with the zone in which the user is present who issued the voice command. Each of the systems 312, 313, 314 comprises respective subsystems of which only one each is numbered, i.e. 312*a*, 313*a*, 314*a*.

Figure 4:
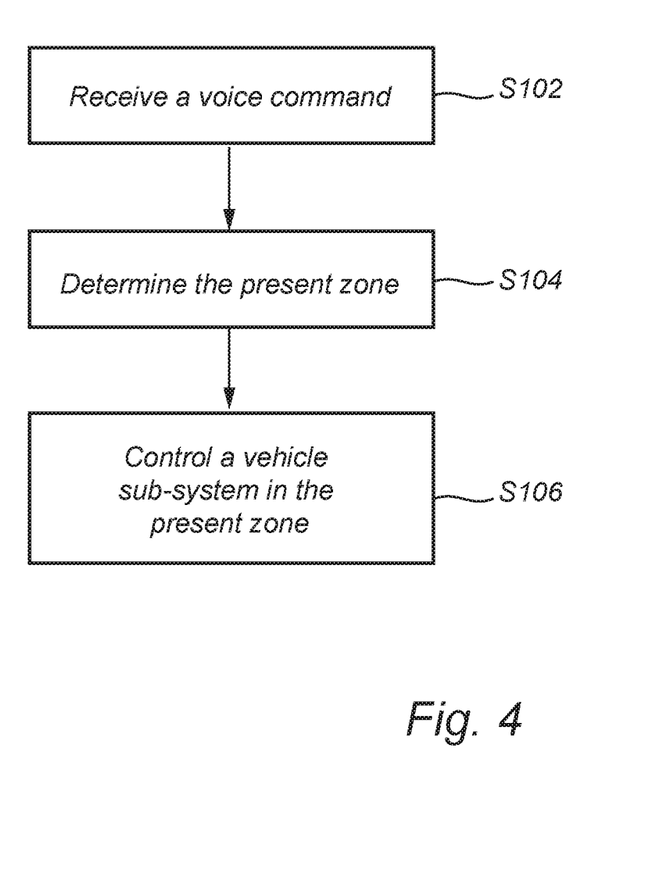
FIG. 4 is a flow-chart of method steps according to embodiments of the present disclosure.

FIG. 4 is a flow-chart of method steps for controlling a vehicle sub-system associated with one of a plurality of zones in a vehicle compartment according to embodiments of the present disclosure. In a first step S102 is a voice command received by a voice assistant system via e.g. an audio capturing device. In step S104 it is determined, based on image data captured by an image capturing device, the present zone from which the voice command originated. Subsequently, in step S106, a control unit which has decoded the voice command provides a control signal to the vehicle sub-system in the present zone for controlling the sub-system according to the decoded voice command.

Figure 5:
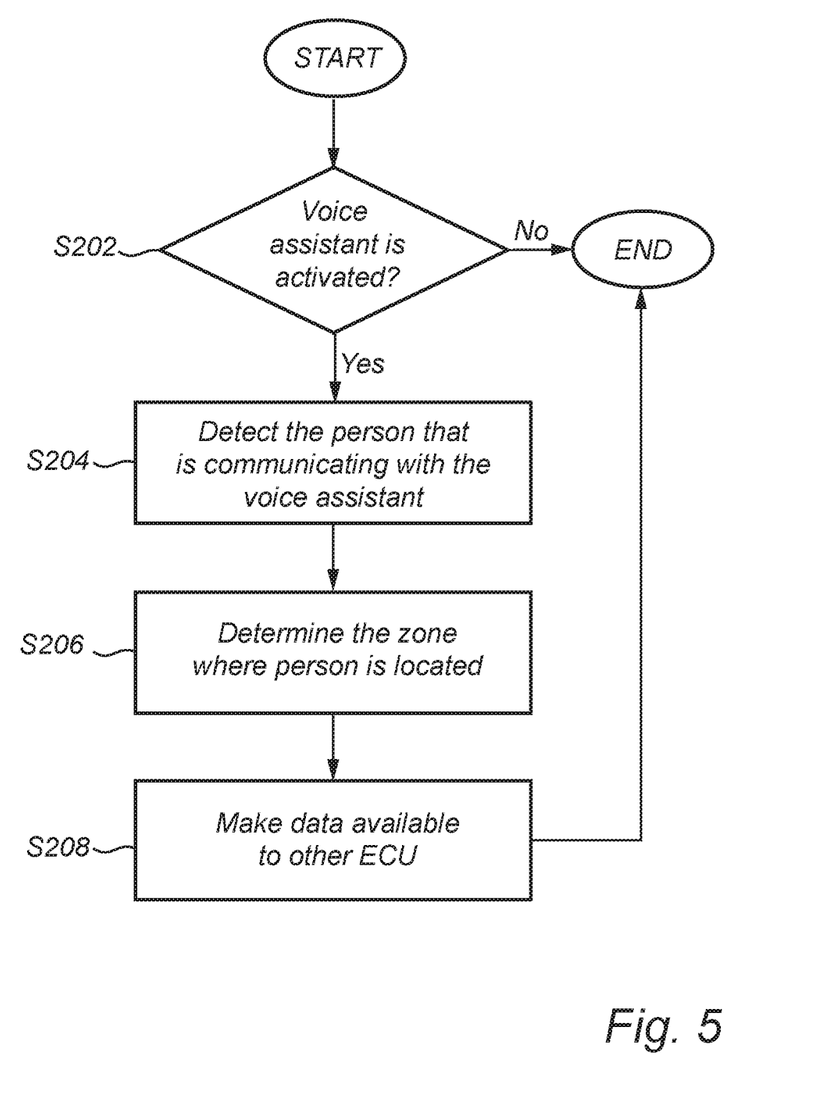
FIG. 5 is a flow-chart of method steps according to embodiments of the present disclosure.

FIG. 5 is a flow-chart which includes a typical workflow for herein disclosed embodiments. Once a voice command is issued by a user, and the voice assistant system is activated in step S202, it is determined who of the vehicle occupants is communicating with the voice assistant system in step S204, i.e. the user is detected. This detection is based on image data captured by an image capturing device in the vehicle. A face tracking functionality may track the users' faces using the image data for determining who of the occupants is communicating with the voice assistant system.

If the voice assistant system was not activated in step S202 before the voice command was issued, the process ends since the voice command was in that case not detected by the voice assistant system.

Once it has been concluded who is communicating with the voice assistant system in step S204, it is determined in which zone of several zones, see e.g. the zones 202, 204, 206, 208, in FIG. 2, the occupant is located, in step S206. This determination may be based on pre-programmed knowledge of the image capturing devices' locations or fields of view in the vehicle and which image capturing device it was that captured the person communicating with the voice assistant system. For example, each of the zones 202, 204, 206, 208 may be equipped with a respective image capturing device.

Next, in step S208, the voice assistant system makes the data including the decoded voice command and the present zone of the user available to the control units of the vehicle systems, each including respective sub-systems 210*a-d* in the different zones of the vehicle. The control unit of the voice assistant system may specifically transmit control signal to the respective system, see e.g. systems 313, 314, 315 in FIG. 3, which itself controls the sub-systems in the present zone of the user according to the voice command.

The present disclosure also includes a computer program product comprising a computer readable medium having stored thereon computer program means for controlling vehicle sub-system associated with one of a plurality of zones in the vehicle compartment. The computer program product comprises code for decoding a voice command captured by an audio capturing device, and code for determining the present zone from which the voice command originated based on image data captured by an image capturing device. Further, there is included code for controlling the vehicle sub-system in the present zone according to the voice command.

A control unit may include a microprocessor, microcontroller, programmable digital signal processor or another programmable device, as well as be embedded into the vehicle/power train control logic/hardware. The control unit may also, or instead, include an application-specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may comprise modules in either hardware or software, or partially in hardware or software and communicate using known transmission buses such as CAN-bus and/or wireless communication capabilities. Thus, communication between control units, or between control units and audio capturing devices, image capturing systems, image capturing devices, etc. may be accomplished by various means know in the art. For example, the communication may be hardwired, using known transmission buses such as CAN-bus and/or wireless communication capabilities.

A control unit of the present disclosure is generally known an ECU, electronic control unit.

There is further provided, according to aspects of the present disclosure, a vehicle comprising the voice assistant system according to any one of the herein disclosed embodiments.

The image data described herein should be understood to preferably include a stream of images such that a face tracking algorithm can track facial motions. Face tracking algorithms are known per se and will not be described in detail herein.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

Various examples have been described. These and other examples are within the scope of the following claims.

The invention claimed is:

1. A voice assistant system configured to receive voice commands and provide instructions to vehicle sub-systems associated with one of a plurality of zones in a vehicle compartment, the voice assistant system comprising:
   at least one audio capturing device for capturing voice commands from a user;
   an image capturing system comprising a face tracking functionality for capturing images of the user and detecting which user is presently issuing a voice command; and
   a control unit configured to:
   receive signals indicative of the voice commands from the audio capturing device,
   receive input signals from the face tracking functionality of the image capturing system configured to track facial motions,
   based on the input signals from the image capturing device indicating the facial motions, detect a present zone of the user issuing the voice command from the plurality of zones,
   based on the detected present zone of the user issuing the voice command, provide a control signal to a sub-system associated with the present zone of the user for controlling the sub-system according to the voice command, and
   provide a feedback control signal to an entertainment sub-system comprising a speaker in the present zone to generate an audio feedback to the user in the present zone via the speaker in the present zone confirming reception or execution of the voice command without providing the audio feedback to other of the plurality of zones.

2. The voice assistance system according to claim 1, wherein only the sub-system associated with the present zone of the user is controlled according to the voice commands, while the sub-system associated with other of the plurality of zones is unaffected.

3. The voice assistance system according to claim 1, wherein the vehicle sub-system includes a control unit configured to receive the control signal.

4. The voice assistance system according to claim 1, wherein the image capturing system includes at least one image capturing device, wherein the control unit is configured to determine the present zone of the user based on image data from the at least one image capturing device.

5. The voice assistance system according to claim 1, wherein the image capturing system is a driver monitoring system.

6. The voice assistance system according to claim 1, wherein the number of zones is at least four.

7. The voice assistance system according to claim 1, wherein, based on user input, the control unit is configured to merge two or more zones into one zone and, based on the detected present zone of the user, provide the control signal to the sub-system associated with the one merged zone for controlling the sub-system according to the voice commands.

8. A control unit configured to receive, from an audio capturing device, signals indicative of voice commands issued by a user in a vehicle, and to receive, from an image capturing system comprising a face tracking functionality configured to track facial motions, input signals indicative of from which zone of a plurality of zones of a vehicle compartment the voice commands originate, wherein the control unit is configured to determine a present zone from which the voice commands originate based on the input signals received from the face tracking functionality indicating facial motions, control a vehicle sub-system in the present zone according to the voice commands, and provide a feedback control signal to an entertainment sub-system comprising a speaker in the present zone to generate an audio feedback to the user in the present zone via the speaker in the present zone confirming reception or execution of the voice command without providing the audio feedback to other of the plurality of zones.

9. The control unit according to claim 8, wherein the control unit is connectable to an audio capturing device adapted to capture the voice commands from the user, and to an image capturing device adapted to capture image data of vehicle occupants, wherein the control unit is configured to receive the voice commend signals from the audio capturing device and the input signals from the image capturing device.

10. A method for controlling a vehicle sub-system associated with one of a plurality of zones in a vehicle compartment, the method comprising:
   receiving a voice command;
   determining a present zone of the plurality of zones from which the voice command originated based on image data indicating facial motions captured by an image capturing device comprising a face tracking functionality,
   decoding the voice command and, based on the present zone from which the voice command originated based on the image data, providing a control signal to the vehicle sub-system in the present zone for controlling the sub-system according to the decoded voice command, and
   providing a feedback control signal to an entertainment sub-system comprising a speaker in the present zone to generate an audio feedback to the user in the present zone via the speaker in the present zone confirming reception or execution of the voice command without providing the audio feedback to other of the plurality of zones.

11. A computer program product comprising a non-transitory computer readable medium having stored thereon instructions for controlling a vehicle sub-system associated with one of a plurality of zones in a vehicle compartment, the instructions executed by a processor to perform the steps comprising:

decoding a voice command captured by an audio capturing device;

determining a present zone of the plurality of zones from which the voice command originated based on image data indicating facial motions captured by an image capturing device comprising a face tracking functionality,     based on the present zone from which the voice command originated based on the image data, controlling the vehicle sub-system in the present zone according to the voice command, and     providing a feedback control signal to an entertainment sub-system comprising a speaker in the present zone to generate an audio feedback to the user in the present zone via the speaker in the present zone confirming reception or execution of the voice command without providing the audio feedback to other of the plurality of zones.

12. A vehicle comprising the voice assistant system according to claim 1.

\* \* \* \* \*